United States Patent [19]
Takizawa

[11] Patent Number: 5,419,219
[45] Date of Patent: May 30, 1995

[54] GEARED MOTOR FOR AUTOMOTIVE POWERED SEAT

[75] Inventor: Kiyotaka Takizawa, Akishima, Japan

[73] Assignee: Tachi-S Co., Ltd., Akishima, Japan

[21] Appl. No.: 139,308

[22] Filed: Oct. 19, 1993

[51] Int. Cl.$^6$ .................... F16H 63/18; G05G 9/10

[52] U.S. Cl. ................... 74/665 GA; 74/337.5; 74/352; 297/362; 297/362.11

[58] Field of Search .............. 475/1, 4, 5, 149, 329, 475/331, 334, 335, 346; 74/332, 337.5, 352, 664, 665 F, 665 GA, 397; 297/362, 362.11

[56] References Cited

U.S. PATENT DOCUMENTS 5,092,197 3/1992 Hauger ...................... 74/665 GA

Primary Examiner—Charles A. Marmor
Assistant Examiner—Sherry L. Estremsky
Attorney, Agent, or Firm—Oldham, Oldham & Wilson

[57] ABSTRACT

A geared motor for an automotive powered seat which is so constructed that a plurality of output gears are disposed around a pinion gear of one single motor such as to be displaceable between an engagement position where one of the output gears is engaged with the pinion gear and a disengagement position where other remainder of the output gears are retained away from the pinion gear. A selection gear and a cam are provided to cause displacement of a selected one of the output gears towards the pinion gear for engagement therewith, so that a drive force of one motor may be outputted to plural seating-posture adjustment devices. A gear selection motor is provided to control rotation of those selection gear and cam for that selective gear engagement purpose.

6 Claims, 3 Drawing Sheets

GEARED MOTOR FOR AUTOMOTIVE POWERED SEAT

BACKGROUND OF INVENTION

1. Field of the Invention

The present invention relates to a geared motor for use in a powered seat of an automobile as a drive source for actuating seating-posture adjustment devices provided in the seat.

2. Description of Prior Art

As typically found in an automotive powered seat, a plurality of seating-posture adjustment devices are installed within the seat and operable by means of their corresponding switches, in order for an occupant on the seat to adjust various positions of seat according to his or her individual seating preferences, tastes and physiques. For instance, a seat slide device is provided for adjustment of fore-and-aft position of the seat, a seat tilting device is provided for adjusting the tilting angle of the seat in the fore-and-aft direction thereof, and a reclining device is provided for adjusting the inclination angle of seat back of the seat.

Hence, a plurality of motors, normally DC geared are used as drive sources for actuating those separate adjustment devices, respectively, under a motor control system having a microcomputer therein.

In the hitherto powered seat, such provision of plural separate motors has been adopted for individual actuations of different seating-posture adjustment devices. But, it has arisen problems in terms of increased number of motors and associated component parts or fittings therefor, resulting in a further increased weight of seat, more intricate structure and extraordinary high costs involved. Moreover, this will inevitably make the devices larger in sizes and cause the consequent increase of seat dimensions, or in particular such increased size of seating adjustment devices will interfere with the cushioning range or cushiony property of the seat.

SUMMARY OF THE INVENTION

In view of the above-stated drawbacks, it is therefore a purpose of the present invention to provide an improved geared motor for an automotive powered seat which is provided as one single drive source to actuate a plurality of seating-posture adjustment devices in the seat.

In order to achieve such purpose, a geared motor, in accordance with the present invention, basically comprises:
- a first motor;
- a pinion gear provided on an output shaft of the first motor;
- a plurality of output gears having a pair of support shafts integrally formed therewith as a center of rotation, which plurality of output gears are arranged around the pinion gear such that each of the output gears is displaceable between an engagement position where it is engaged with the pinion gear and a disengagement position where it is disengaged from the same;
- a selection gear provided on the output shaft of the first motor such as to be rotatable thereabout;
- a cam means provided integrally with the selection gear, the cam means being so formed as to include a continuous peripheral surface therein, wherein a circular or arcuate inactive portion and an active portion are defined in the continuous peripheral surface;
- one of the pair of support shafts associated with each of the output gears being movably supported in the cam means, such that one of the output gears will be displaced to the engagement position, while another remaining output gear will be retained at the disengagement position; and
- a second motor operatively connected with the selection gear, the second motor being adapted to cause the selection gear to rotate in a direction to bring the active portion of the cam means to a point corresponding to such one of the output gears selected for engagement with the pinion gear, whereby operation of the second motor will cause rotation of the selection gear to bring the cam means active portion to a selected one of the output gears, thereby displacing the selected one of the output gears to the engagement position, so that a drive force of the first motor will be transmitted only to the selected output gear and further will be outputted to an associated external device via an output transfer means provided at each of the output gears.

Accordingly, only one geared motor is capable of actuating the plural external devices, i.e. plural seating-posture adjustment devices, through corresponding plural output gears and gear selection mechanism described above, which eliminates the problems set forth in the description of prior art.

Preferably, the cam means may comprise a generally annular cam groove formed in one plane of the selection which faces towards the output gears, which annular cam groove is formed as a continuous annular shape, and such one of said pair of support shafts associated with each of the output gears may be inserted movably in said annular cam groove.

In one aspect of the invention, the cam means may be formed in such generally annular cam groove having a horizontal groove portion as the active portion and a circular or arcuate groove portion as the above-mentioned inactive portion, in such a manner that the horizontal groove portion forms a chord in a circle along which the circular or arcuate groove portion lies, thus projecting inwardly of a circumference of the annular cam groove, whereby said selected one of the output gears will be displaced along and by the horizontal groove portion towards and into engagement with the pinion gear of the first motor.

As another preferred mode of the invention, there may be a means for allowing those plural output gears to be movable in a radial direction relative to the pinion gear of the first motor, so that the selected one of output gears may only be displaced toward the pinion gear and other remainder of the output gears may be retained circumferentially of the pinion gear, laying substantially along the circular or arcuate inactive portion of the cam means.

Preferably, the selection gear may be of an external gear type having external teeth, and the second motor may have, provided on its output shaft, a pinion gear engageable with the external teeth of the selection gear.

Any other advantages and features of the present invention will become apparent from reading of the disclosure hereinafter, with reference to the drawings.

DETAILED DESCRIPTION OF PREFERRED EMBODIMENTS OF THE INVENTION

Figure 1:
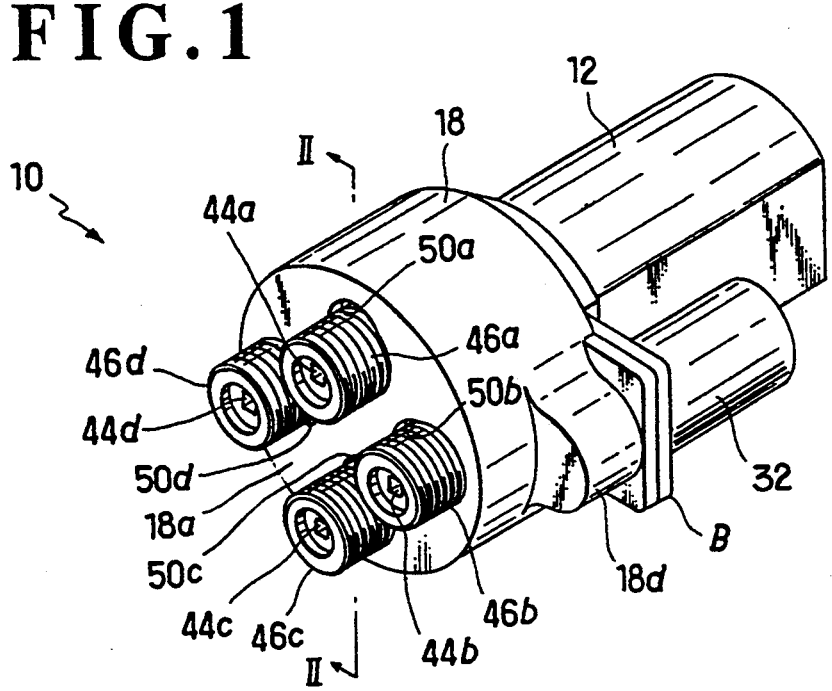
FIG. 1 is a perspective view of a geared motor in accordance with the present invention.

FIG. 1 illustrates, in the perspective, a geared motor for use in an automotive powered seat, which is generally designated by (10).

In this embodiment, the geared motor (10) is shown to comprise a main motor (12), a gear selection motor (32), a gear casing (18) and four engagement screw members (46a)(46b)(46c)(46d) to be threaded engaged with four torque cables. As will be described later, one of those engagement screw members (46a, 46b, ... ) is selectively brought into an interlocking relation with the main motor (12) via an gear selection mechanism in the present invention. By way of example, with reference to FIG. 6 with FIG. 1, the engagement screw members (46a)(46b)(46c)(46d) may be engaged with the corresponding engagement screw portions (not shown) respectively of four torque cables (42A)(42B)(42C)(42D).

Figure 6:
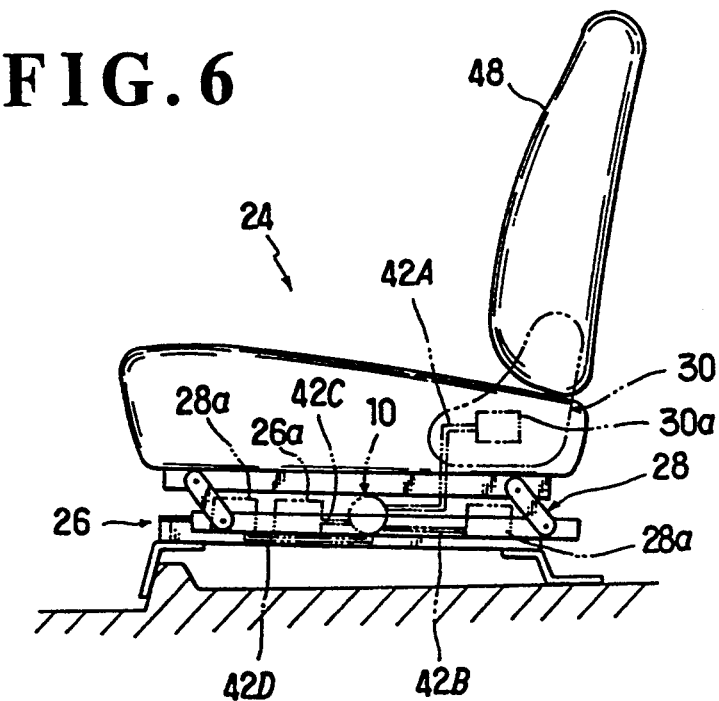
FIG. 6 is a schematic side elevational view of an automotive powered seat in which the geared motor of the present invention and associated seating-posture adjustment devices are installed.

As shown in FIG. 6, in accordance with one example of arrangement of the present invention, there may be provided an automotive powered seat (24) having a seat slide device (26), a seat tilting device (28) and a reclining device (30). The seat slide device (26) may be actuated by drive mechanism (26a). Likewise, the seat tilting device (28) be actuated by two drive mechanisms (28a)(28a), and the reclining device (30) be actuated by a drive mechanism (30a). They are known devices for adjusting their respective seating positions, and a specific explanation thereon is deleted.

The four drive mechanisms (26a, 28a, 28a, 30a) noted above may be operatively connected with the one motor (10) through torque cables (42C)(42D)(42B)(42A), respectively. Thus, as mentioned earlier, the engagement screw portion (not shown) provided at one free end each of the torque cables (42A)(42B)(42C)(42D) may be threadedly engaged with the corresponding engagement screw members (46a)(46b)(46c)(46d) associated with the geared motor (10).

Referring now to FIGS. 2 through 5, there is shown one preferred embodiment of a gear section mechanism in accordance with the present invention, which is applied to the motor (10), permitting a selective interlocking relation of the main motor (12) with one of the foregoing four torque cables (42A, 42B, ... ).

Figure 2:
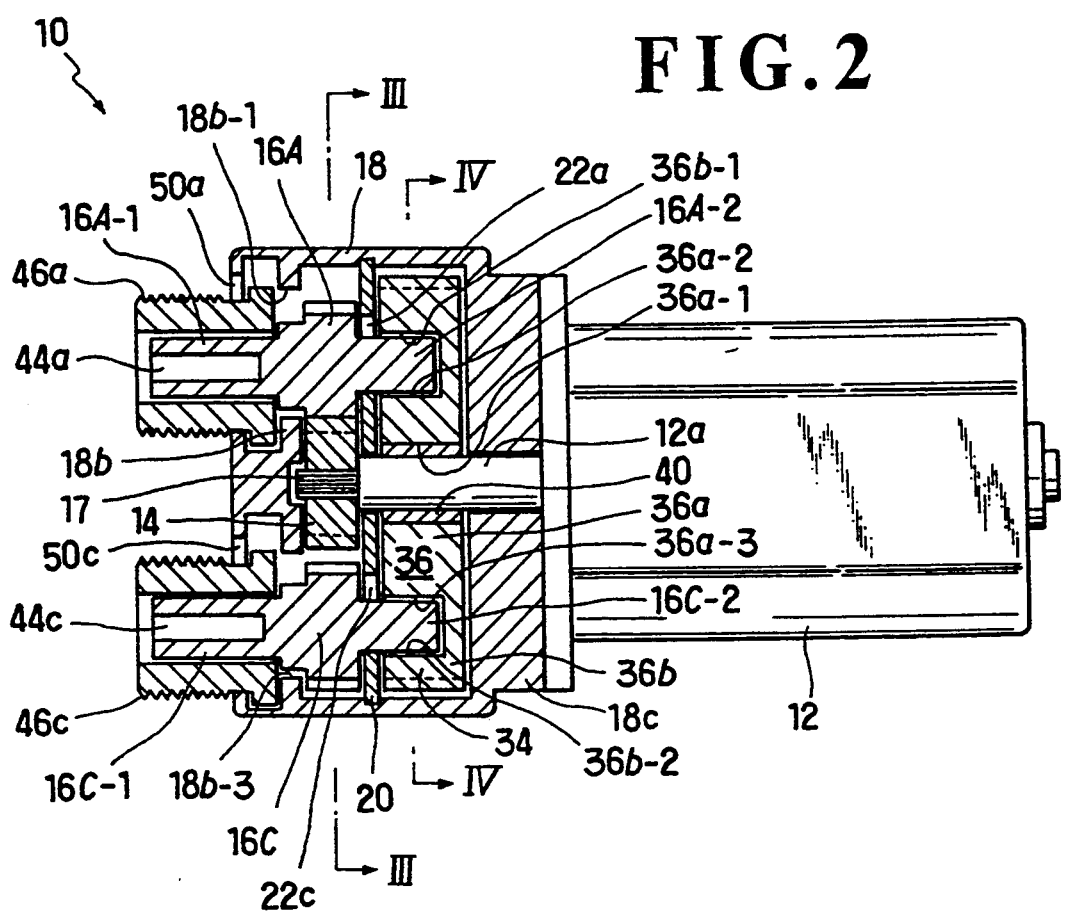
FIG. 2 is a sectional view taken along the line II—II in the FIG. 1.
Figure 3:
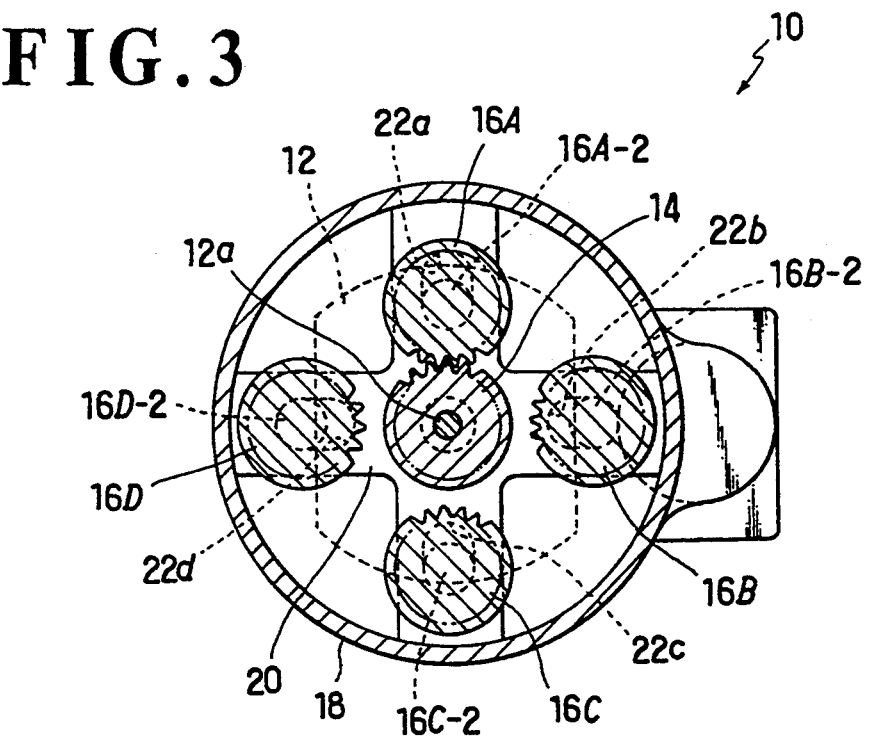
FIG. 3 is a sectional view taken along the line III—III in the FIG. 2.

As best shown in FIG. 2, the interior of the gear casing (18) is partitioned by a frontal wall (18a), an intermediate wall (18b) and a rearward end wall (18c). The main motor (12) is fixed to the rearward end wall (18c), such that the output shaft (12a) thereof extends through the center of the rearward end wall (18c) into the inside of the casing (18).

A generally cross-shaped support plate (20) is securely disposed between the intermediate and rearward end walls (18b)(18c) within the casing (18). In this regard, as shown in FIG. 5, the support plate (20) is formed at its center with a central hole (20a) through which the output shaft (12a) of main motor (12) passes to project a spline connection end (17) towards the inner surface of intermediate wall (18b).

Disposed between the support plate (20) and rearward end wall (18c) is a selection gear (36) having a central hole (36a-1) through which the main motor output shaft (12a) passes via a bush member (40). Thus, the selection gear (36) is rotatably supported on the shaft (12a). As shown in FIG. 5, the selection gear (36) is of an external gear type having external teeth meshed with the a relatively small pinion gear (38) fixed to the output shaft (32a) of gear selection motor (32).

Figure 5:
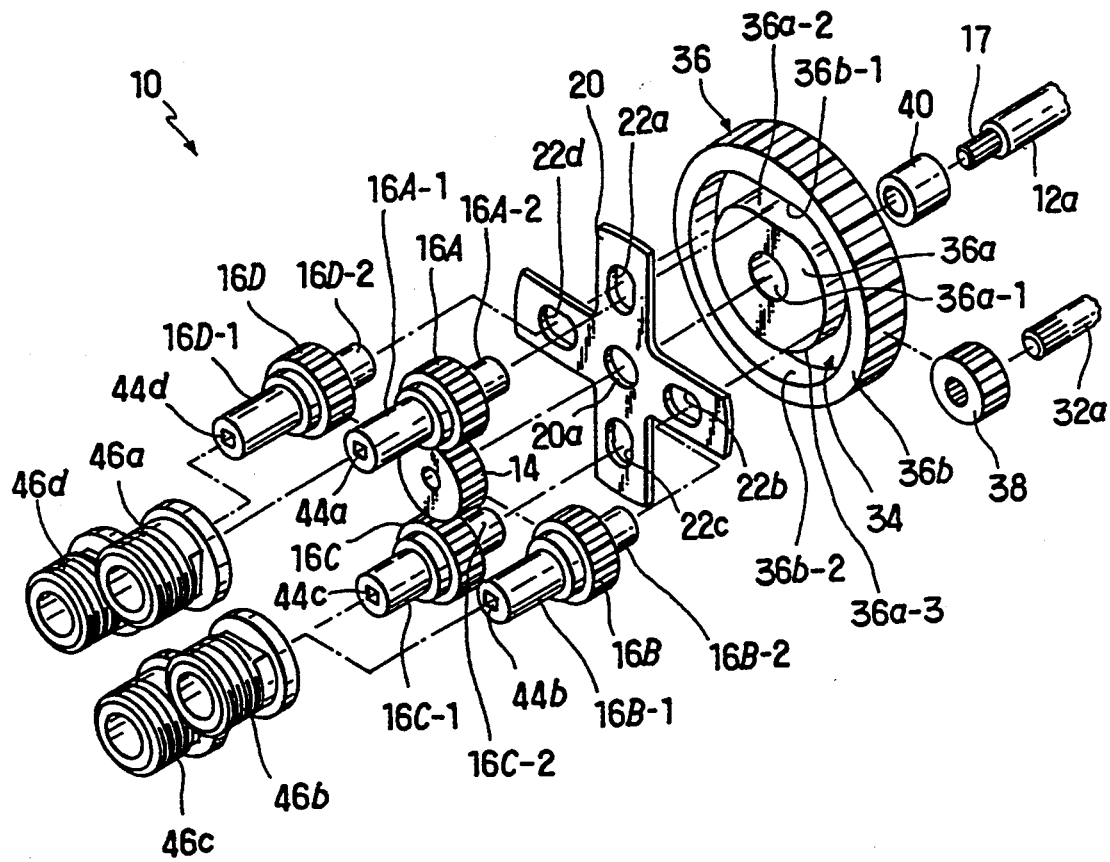
FIG. 5 is a schematic, exploded perspective view of the geared motor.

Referring particularly to FIG. 5, the cross-shaped support plate (20) is formed, at its four radially, outwardly extending leg portions, with four elongated holes (22a)(22b)(22c)(22d), respectively. On the other hand, the inward plane of the selection gear (36), which faces towards the support plate (20), is formed with a generally annular cam groove (34), which in turn, basically, defines outer ring-like portion (36b) and inner protrudent portion (36a) of generally circular shape, in the gear (36).

The cam groove (34) is shown to include a horizontal active cam portion (34b) which is defined by forming horizontal inner and outer surface parts (36b-1) (36a-2) in the outer ring-like and inner circular protrudent portions (36b)(36a), respectively. Namely, the former (36b-1) is defined in the upper area of inward peripheral surface (36b-2) of the outer ring-like portion (36b), while likewise the latter (36a-2) is defined in the upper area of outer peripheral surface (36a-3) associated with the inner protrudent portion (36a).

Referring again to FIG. 2 in conjunction with FIG. 5, it is seen that a group of four output gears (16A)(16B)(16C)(16D) and one pinion gear (14) are disposed between the support plate (20) and intermediate wall (18b) within the casing (18).

Specifically, the pinion gear (14) is spline connected to the spline connection portion (17) of output shaft (12a) of the main motor (12) which projects inwardly of the support plate (20) at the central hole (20a) thereof, so that the pinion gear (14) is located at the central axis of the casing (18). Disposed circumferentially of and adjacent to that pinion gear (14) are the four output gears (16A)(16B)(16C)(16D).

As can be seen in FIG. 5, each of those output gears (16A, 16B ... ) has a pair of forward and rearward cylindrical support shafts formed integrally on the opposite sides thereof, extending coaxially outwardly therefrom. In brief, a first set of designations (16A-1)(16A-2) denotes forward and rearward support shafts formed on the first output gear (16A), respectively, and likewise, another remaining three sets of designations (16B-1, 16B-2), (16C-1, 16C-2) and (16D-1, 16D-2) each refers to forward and rearward shafts with regard to the respective remaining second, third and fourth output gears (16B)(16C)(16D).

The intermediate wall (18b) formed internally of the casing (18) is formed with four elongated holes, although not clearly shown in FIG. 2, but as assumable from the designations (18b-1) and (18b-3). Those four elongated holes are arranged in the intermediate wall (18b) such that they are disposed in alignment with the aforementioned four elongated holes (22a)(22b)(22c) (22d) formed in the support plate (20), respectively. For, the designation (18b-1) refers to the first elongated hole of this particular intermediate wall (18b) laying in correspondence with the first elongated hole (22a) of support plate (20), and the designation (18b-3) refers to the third elongated hole of intermediate wall (18b) corresponding to the one (22c) of support plate (20). It should be therefore understood that another remaining second and fourth elongated holes (as can be designated by (18b-2) and (18b-4)) are formed in the intermediate wall (18b) in correspondence with the second and fourth ones (20b) (20d) of support plate (20). The opening dimensions of the four elongated holes of intermediate wall (18b) should be substantially equal to those of the four elongated holes of support plate (20).

As can be seen from FIG. 5, the four backward support shafts (16A-2)(16B-2)(16C-2) and (16D-2) respectively of the four output gears (16A)(16B)(16C) and (16D) pass through the corresponding four elongated holes (22a)(22b)(22c) and (22d) formed in the support plate (20), and are all inserted in the cam groove (34) of the selection gear (36) in such a manner as to be rotatable and slidable therealong.

On the other hand, the opposite four forward support shafts (16A-1)(16B-1)(16C-1) and (16D-1) respectively of the same four output gears (16A)(16B) (16C)(16D) pass through the above-noted four elongated holes of the intermediate wall (18b) (see (18b-1) and (18b-3) in FIG. 2), and are rotatably inserted in the through-bores of four engagement screw members (46a)(46b)(46c)(46d), respectively.

Accordingly, it is seen that the four output gears (16A)(16B)(16C)(16D) are movable radially in relation to the center or output shaft (12a) of motor (12) in a direction to engage with and disengage from the central pinion gear (14), along all the respective elongated holes mentioned above. For that purpose, essentially, those elongated holes should be formed to have proper opening dimensions allowing such radial movement of the four output gears.

Referring now particularly to the designations (50a)(50b)(50c)(50d) in FIGS. 1 and 2, they represent four elongated holes formed in the frontal surface (18a) of gear casing (18), which are arranged in the same radial manner with the elongated holes (20a)(20b) (20c)(20d), respectively. As understandable from FIG. 2, the four engagement screw members (46a)(46b) (46c)(46d) are secured, at their flange base portions, in the spacing defined between the frontal and intermediate walls (18a)(18b) within the casing (18), and project their threaded engagement portions through the corresponding elongated holes (50a)(50b)(50c)(50d) towards the outside of casing (18) as in FIG. 1.

It is noted that the four engagement screw members (46a)(46b)(46c)(46d) should only be slidable along their respective elongated holes (50a)(50b)(50c)(50d), but prevented against rotation therein, as for example by forming a suitable rotation-preventive portion in each of those engagement screw members.

The forward support shafts (16A-1)(16B-1)(16C-1) (16D-1) associated respectively with the four output gears (16A)(16B)(16C)(16D) are each formed therein with a rectangular bore, as understandable by the designations (44a)(44b)(44c)(44d). Into each of such rectangular bores (44a, 44b . . . ), a mating terminal (not shown) of torque wire having similar rectangular shape associated with one of torque cables (42A,42B . . . ) may be inserted for positive threaded engagement between both torque cables and engagement screw members as described previously.

With the above-described gear mechanism, one of the four output gears (16A, 16B . . . ) can be selectively brought to a meshed engagement with the pinion gear (14) so as to transmit the rotation through a selected one of torque cables (42A, 42B . . . ) to an intended one of the seating-posture adjustment devices (26, 28, 30). Now, a specific description will be made of this gear selection operation, with reference to FIGS. 3 and 4.

Figure 4:
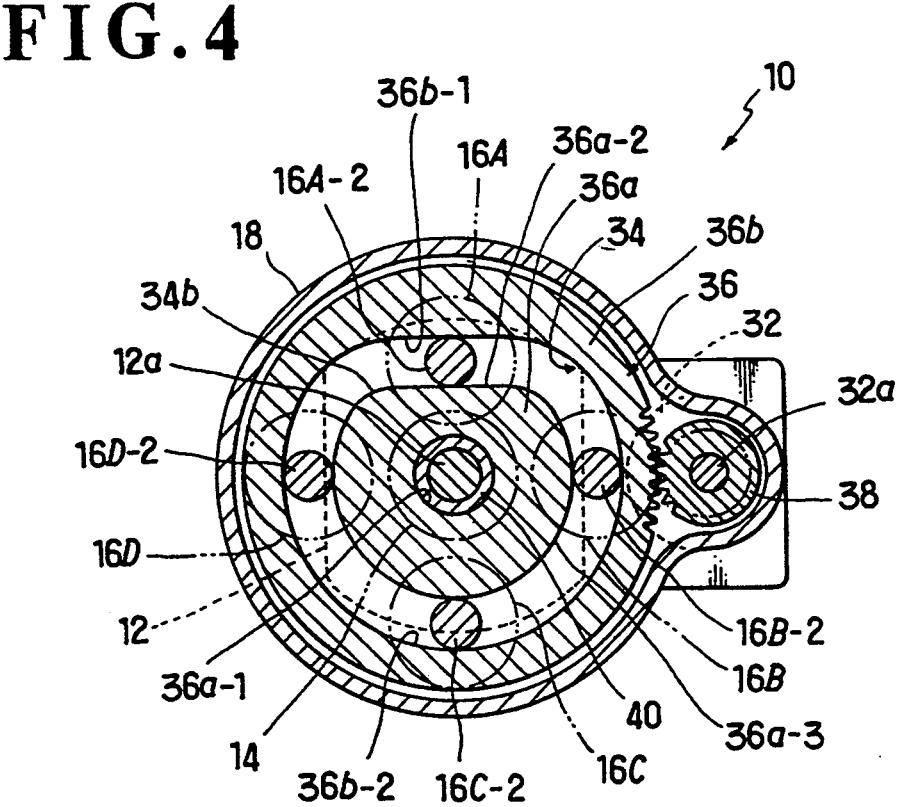
FIG. 4 is a sectional view taken along the line IV—IV in the FIG. 2.

As shown in FIG. 4, only the first output gear (16A) is in a meshed engagement with the pinion gear (14) because the backward support shaft (16A-2) of that gear (16A) is being located in the horizontal active portion (34b) of the cam groove (34) which is defined by the horizontal groove surfaces (36a-2)(36b-1), placing thus the first output gear (16A) in an engagement position with respect to the pinion gear (14). By contrast, other three output gears (16B) (16C)(16D) are placed in a disengagement position with respect to the pinion gear (14) in view of the fact that all the backward support shafts (16B-2)(16C-2) (16D-2) of those particular output gears (16B)(16C) (16D) are situated in the circular inactive portion of the cam groove (34) which is defined by the circular or arcuate groove surfaces (36b-2)(36a-3).

In other words, the first output gear (16A) is biased to a point inwardly of the circumference of annular cam groove (34) by way of the horizontal active portion (34b) forming a chord in a circle along which the cam groove (34) lies, whereas by contrast, other remaining three output gears (16B)(16C)(16D) are retained at a point laying on the circumference of the same groove (34). It is important here that the active cam portion (34b) be formed on such chord, a distance from the cam groove circumference, enough to bias a selected one of the four output gears (i.e. the first output gear (16A) in this case) into engagement with the pinion gear (14).

Then, if the selection gear (36) is rotated clockwise at 90 degrees by operation of the gear selection motor (32) as viewed from FIG. 4 the horizontal active portion (34b) of cam groove (34) is displaced at 90 degrees along the circumferential direction of that generally annular cam groove (34), at 90 degrees, towards the second output gear (16B). Consequently, the second output gear (16B) is placed in an engagement position with respect to the pinion gear (14), and thus engaged with the latter.

Accordingly, it is appreciated that, through the normal or reverse drive of the gear selection motor (32), the selection gear (36) may be rotated as desired to cause displacement of the active cam portion (34b) of cam groove (34) toward a selected one of the four output gears (16A, 16B . . . ) in order that the selected output gear will be engaged with the pinion gear (14).

In the present embodiment, a suitable switch and control system (not shown) may be provided to control the drive of gear selection motor (32) for permitting such 90 degree rotation or desired angle of rotation of the selection gear (36) to bring a desired one of the output gears (16A, 16B . . . ) into engagement with the pinion (14).

The gear selection motor (32) is supported firmly by a bracket (B) provided on the casing (18) as shown in FIG. 1. Designation (18d) denotes a casing portion covering the pinion gear (38) of that motor (32).

It is noted that the number of the output gears is not limited to four, but may be decreased or increased, depending on the number of seating-posture adjustment devices to be connected with the present geared motor (10). Also, the elongated holes (20a, 20b ...) of the support plate (20) are not limited to four in number and not limited to the 90-degree disposition, neither, but may be provided in any desired number and in any desired radially extending manner relative to the main motor output shaft (12a), insofar as it serves the above-described selective gear engagement purpose.

Preferably, a stopper gear (not shown) may be provided at each of the output gears (16A, 16B...) so that, excepting one of those output gears engaged with the pinion gear (14), all another three ones disengaged therefrom are prevented against rotation by the stopper gear. This is effective in avoiding an accidental movement of the associated seating-posture devices connected with those output shafts, which may occur due to any unnecessary external force being applied to the drive mechanisms thereof.

With the present invention constructed above, there is no need to install a plurality of separate motors for actuating the respective seating-posture adjustment devices, as found in the prior art, because of the novel gear selection mechanism being provided with respect to one pinion gear of motor, allowing plural drive mechanisms to be actuated individually by operation of one single motor through the simplified arrangement of cam groove and radial disposition of plural output gears relative to that one pinon gear of motor. Therefore, all the defective points of the prior art stated previously can be eliminated.

Another advantageous aspect of the present invention is that the active portion (34b) of the cam groove (34) may be provided relatively large, requiring no high precision in determining the position range of the active portion (34b) per se, hence allowing easier formation of the cam groove (34).

In addition, advantageously, a high torque rate may be set for the main motor (12) since it is provided separate from the gear selection motor (32), which makes applicable the present geared motor to a high-load seating-posture adjustment device as well.

While having described the present invention, it should be understood finally that the invention is not limited to the illustrated embodiment, but any other modifications, replacements and additions may be structurally applied thereto without departing from the scopes and spirits of the appended claims. For example, the cam groove (34) may be provided as a separate member, independently of the selection gear (36), such as to be rotatable integrally therewith. Further, the cam groove (34) may be formed into a ring cam having a generally semi-circular shape identical to that of cam groove (34), and it may be arranged such that either outer or inner peripheral surface of such ring cam is formed as a operative cam surface functioning as the above-stated horizontal active and circular inactive portions of cam groove (34). Alternatively, the cam groove (34) may be formed into a solid cam, independently of the selection gear (36), which also has a generally semi-circular shape identical to that of cam groove (34), and in that case, a suitable connecting pin may be interposed between the solid cam and selection gear (36) for connecting them together in an interlocking way. Moreover, the rectangular shape of engagement bores (44a, 44b...) may be formed into another non-circular shape for preventing rotation of torque wire therein. Of course, the present invention may be applied to other kinds of seats used in a train, airplane, ship, barber or massage room.

What is claimed is:

1. A geared motor device for an automotive powered seat, comprising:

a first motor;

a pinion gear provided on an output shaft of said first motor;

a plurality of output gears, each having a pair of support shafts integrally formed therewith as a center of rotation, said plurality of output gears being arranged around said pinion gear such that each of said output gears is displaceable between an engagement position where it is engaged with said pinion gear and a disengagement position where it is disengaged from the same;

a selection gear provided on said output shaft of said first motor such as to be rotatable thereabout;

a cam means provided integrally with said selection gear, said cam means being so formed as to include a continuous peripheral surface therein, wherein a circular or arcuate inactive portion and an active portion are defined in said continuous peripheral surface;

one of said pair of support shafts associated with each of said output gears being movably supported in said cam means, such that one of the output gears will be displaced to said engagement position, while another remaining output gears will be retained at said disengagement position; and a second motor operatively connected with said selection gear, said second motor being adapted to cause said selection gear to rotate in a direction to bring said active portion of said cam means to a point corresponding to said one of said output gears selected for engagement with said pinion gear, whereby operation of said second motor will cause rotation of said selection gear to bring said cam means active portion to a selected one of said output gears, thereby displacing said selected one of said output gears to said engagement position, so that a drive force of said first motor will be transmitted only to said selected output gear and further will be outputted to an external device via an output transfer means provided at each of said output gears.

2. The geared motor device as claimed in claim 1, wherein said cam means comprises a generally annular cam groove formed in one plane of said selection gear which faces towards said plurality of output gears, said annular cam groove being formed as a continuous annular shape, and wherein said one of said pair of support shafts associated with each of said output gears is inserted movably in said annular cam groove.

3. The geared motor device as claimed in claim 2, wherein said generally annular cam groove is formed with a linear groove portion as said active portion and a circular or arcuate groove portion as said circular or arcuate inactive portion, in such a manner that said horizontal groove portion forms a chord in a circle along which said circular or arcuate groove portion lies, thus projecting inwardly of a circumference of said annular cam groove, whereby said selected one of said output gears will be displaced along and by said horizontal groove portion towards and into engagement with said pinion gear of said first motor.

4. The geared motor device as claimed in claim 1, wherein said geared motor includes a means for allowing said plurality of output gears to be movable in a radial direction relative to said pinion gear of said first motor, so that said selected one of said output gears may only be displaced toward said pinion gear and other remainder of said output gears may be retained circumferentially of said pinion gear, laying substantially along said circular or arcuate inactive portion of said cam means.

5. The geared motor device as claimed in claim 1, wherein said selection gear is of an external gear type having external teeth, and wherein said second motor has, provided on its output shaft, a pinion gear engageable with said external teeth of said selection gear.

6. The geared motor as claimed in claim 1, wherein another of said pair of support shafts associated with each of said output, gears, opposite to said one of them supported in said cam, is formed with a non-circular engagement bore therein, wherein said output means comprises a torque cable having a terminal whose shape is generally identical to that of said non-circular engagement bore, and wherein said terminal of said torque cable is engaged into said engagement bore of each of said output gears, to thereby connect said geared motor with said external device.

* * * * *